2,826,605
PRODUCTION OF CYCLOHEXYLSULFAMATES

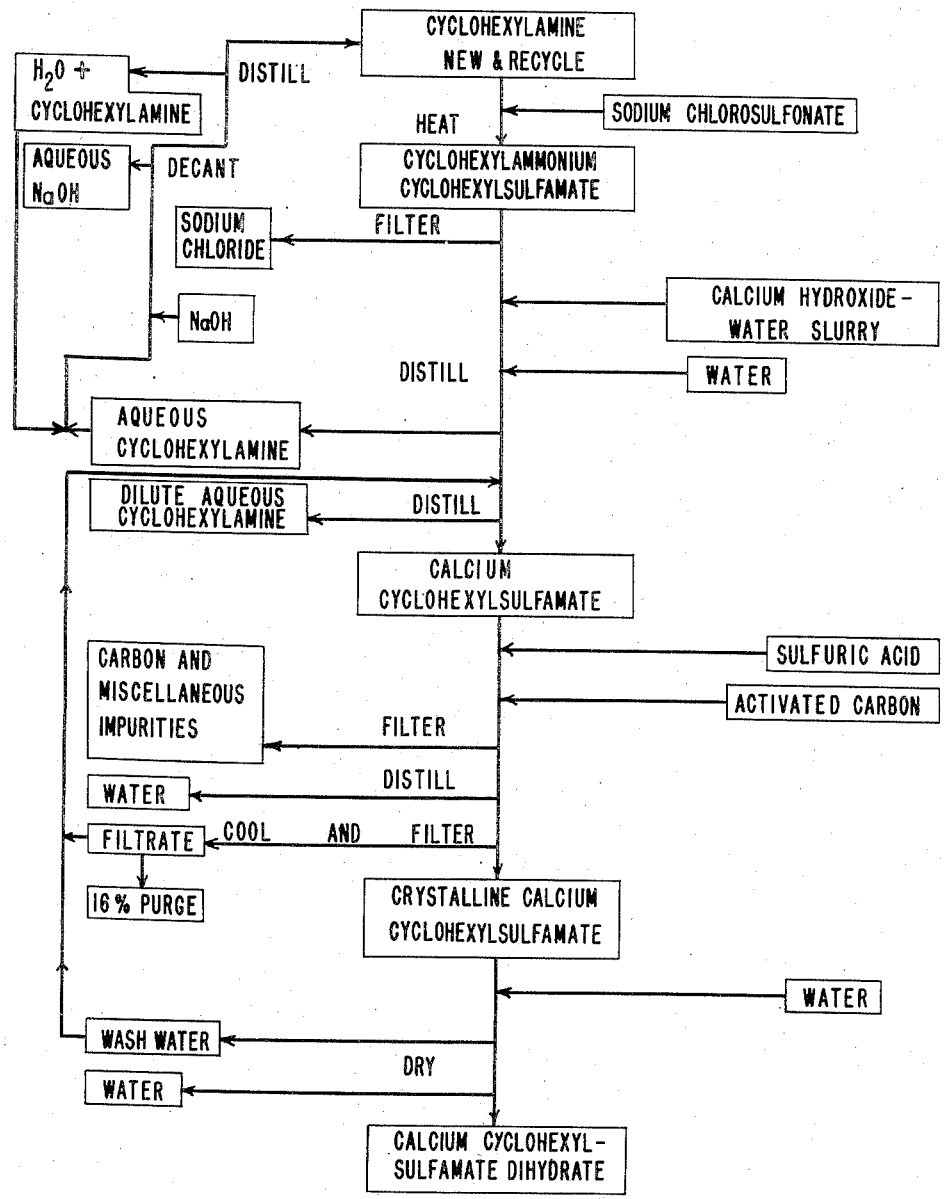

Wallace W. Thompson, New Castle, Del., assignor to E. I. du Pont de Nemours and Company, Wilmington, Del., a corporation of Delaware Application July 27, 1956, Serial No. 600,569

2 Claims. (Cl. 260—500)

This invention relates to the preparation of salts of cyclohexylsulfamic acid and is more specifically directed to the preparation of cyclohexylammonium cyclohexylsulfamate by a reaction between cyclohexylamine and an alkali metal chlorosulfonate, and to the preparation of metallic salts of cyclohexylsulfamic acid from such cyclohexylammonium cyclohexylsulfamate.

In the attached drawing there is illustrated, in the form of a flow sheet, a typical process of my invention.

According to the present invention, an alkali metal chlorosulfonate and cyclohexylamine are mixed together and allowed to react. The manner of addition, the rate and extent of heating are comparatively indifferent. Good results are obtained by mixing the entire quantity of reactants and simply allowing the temperature of the reaction mixture to rise with the heat of reaction. To insure complete conversion of the sulfonate to cyclohexylammonium cyclohexylsulfamate, the reaction mixture can be heated to reflux temperature after the initial exothermic reaction has subsided.

In processes of the invention, the first step involves, then, mixing cyclohexylamine and an alkali metal chlorosulfonate, the alkali metal being preferably sodium or potassium. These react according to the equation:

(1)

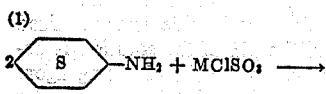

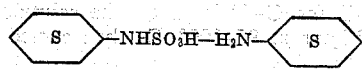

wherein M represents alkali metal such as lithium, sodium, potassium, and the like.

Alkali metal chloro sulfonates are known compounds and are readily prepared from alkali metal chlorides and sulfur trioxide as taught by U. S. Patent 2,218,729. They can also be prepared from chlorosulfonic acid and a metal halide such as sodium chloride.

Cyclohexylamine is mixed with the alkali metal chlorosulfonate in proportions such that the cyclohexylamine is present in an amount in excess of the stoichiometric quantity. For satisfactory results, I have found that the mole ratio of cyclohexylamine to the alkali metal chlorosulfonate should be within the range of from 5 to 40, preferably 10 to 20. It will be understood, of course, that in this step of my invention two equivalents of the cyclohexylamine are used for each metal chlorosulfonate.

From the standpoint of ease of operating step 1, it is preferred to use a high ratio of cyclohexylamine to the metal salt say, for example, 32:1. However, too high a ratio, i. e., above about 40, is to be avoided since the filtration operation will be rendered more difficult, and there will be greater contamination of the product with by-product sodium chloride. Additionally, ratios above 40 are not desirable, since distillation time increases per unit weight of product making the operation less attractive from an economic standpoint. The total amount of liquids handled is also increased.

At the lower limit of the cyclohexylamine metal chlorosulfonate mole ratio say, about 5, the system should be pressurized so that the boiling point of the reaction mixture would be raised sufficiently to insure complete solution of the cyclohexylammonium cyclohexylsulfamate. For instance, at a pressure of 20 p. s. i. g., the temperature of the mixture should be about 160° C. to insure solution of the cyclohexylsulfamate.

It is preferred to add the alkali metal chlorosulfonate to the cyclohexylamine, though this is not necessary. If desired, the amine can be added to the chlorosulfonate; or both reactants can be mixed together, preferably in a pressure vessel, all at once. Additionally, the reactants can be brought together continuously in a continuous-type process in suitable equipment.

Immediately after the amine and alkali metal chlorosulfonate are brought together, heat is liberated and the temperature of the reaction mixture rises. For instance, an increase of 30° C. (from 27° to 56°) has been observed when sufficient sodium chlorosulfonate was added to cyclohexylamine to give a final mole ratio of amine to sulfonate of 30:1. If the reaction mixture is allowed to stand at ambient temperatures for a long enough time, the reaction will go substantially to completion. It is preferred, however, in commercial operation to insure complete reaction and to maintain the resulting cyclohexylammonium cyclohexylsulfamate in solution by heating the mixture near to or at reflux temperature (130±5° C.) after all of the alkali metal chlorosulfonate has been added.

It should be noted that instead of mixing the reactants at ambient temperatures, one or both can be preheated to supply the heat to bring the mixture to reflux temperature. The fact that the mode of heating and the temperatures used are not critical is one of the advantages of the present invention.

The rate of the reaction (step 1) will, of course, depend upon the temperature of the reaction. The rate will also depend upon the particular alkali metal chlorosulfonate used in the reaction. Thus, when the reaction is conducted with a particular alkali metal chlorosulfonate the temperature can be selected so that the reaction will proceed to completion with reasonable rapidity. A particularly preferred mode of operation is to add the desired amount of sodium chlorosulfonate at a convenient rate allowing the temperature to rise uncontrolled.

The reaction mixture is preferably maintained at reflux temperature for a period of from several minutes to an hour or more. While the duration of the heating period is not in any sense critical, I have found a period of from 10 to 15 minutes highly satisfactory. After the mixture is refluxed, it is filtered hot to remove the metal chloride by-product. It is necesasry to maintain the solution hot during this filtration in order to prevent crystallization of the cyclohexylammonium cyclohexylsulfamate.

The cyclohexylammonium cyclohexylsulfamate produced can be isolated from the reaction system in any convenient fashion. For example, after the by-product alkali metal chloride has been filtered off, the filtrate is cooled and the resulting solids collected by filtration. These solids are then dried and are found to consist essentially of cyclohexylammonium cyclohexylsulfamate. Following removal of the by-product halide, the excess cyclohexylamine can be removed by distillation, preferably azeotropically with water, and the desired cyclohexylsulfamate recovered from the aqueous residue.

Instead of isolating the cyclohexylammonium cyclohexylsulfamate, it is a preferred practice in those instances where a salt of cyclohexylsulfamic acid is desired to convert the cyclohexylammonium cyclohexylsulfamate directly to the salt by discharging the filtrate from the first step into an aqueous system containing an appropriate metal hydroxide, i. e., a metal hydroxide corresponding to the desired salt.

Thus, in step 2 of my process, cyclohexylammonium cyclohexysulfamate can be mixed with an aqueous solution or slurry of hydroxides of sodium, potassium, lithium, magnesium, calcium, barium, silver, or the like. Then cyclohexylamine is removed from the system by azeotropic distillation, by extraction or any other suitable means such as salting out with various salts and hydroxides. After recovery, the cyclohexylamine is available for recycle to the first step. It is preferred to use azeotropic distillation.

The amount of metal base used should be at least that equivalent to the cyclohexylammonium cyclohexylsulfamate and more can be used without any great disadvantage. A slight excess (5 to 10%) is preferred if all the cyclohexylamine is to be removed azeotropically.

The reaction (step 2) can be shown as follows:

(2)

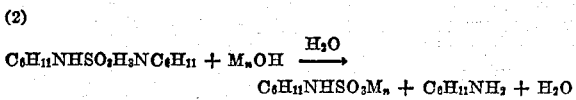

In the above formula M represents a metal such as sodium, potassium, lithium, calcium, barium, magnesium, manganese, other alkali and alkaline earth metals, and other metals such as silver. Of course, n represents the reciprocal of the valence of the metal.

Purification of the desired metal salt following its recovery from the distillation residue can be accomplished by any standard method or combination of methods such as solvent extraction, absorption of impurities on high surface area solids like carbon blacks, filtration to remove insolubles, and the like.

After an alkaline metal cyclohexylsulfamate has been prepared according to a process of the invention, it can thereafter be converted to the cyclohexylsulfamate of another metal. Any convenient method of cation exchange can be used, such as the use of an ion exchanger or relative solubilities permitting selective precipitation.

As already indicated, the comparatively indifference of the mode of heating, temperatures used, and manner of addition of reactants are advantages of the present process. Additionally, the process of the invention has the distinct advantage of being extremely versatile in that one is not limited to the metallic salt corresponding to the metallic element of the chlorosulfonate. The metal, e. g. sodium, and the chloride part of the reactants surprisingly can be removed early in my process so that neither contaminate the product. It would be undesirable to have sodium chloride present in relatively large amounts when oher metallic salts were being prepared for several reasons. First, the straight contamination of the product with sodium chloride. Second, the cross contamination of the desired metallic salt with sodium cyclohexylsulfamate which would be present because of the following equilibrium:

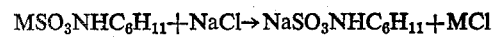

Third, the contamination of the desired metallic salt with the metallic chloride formed as per equation above. The process of the invention eliminates all or most of these potential sources of contamination.

In order that the invention may be better understood reference should be had to the following specific examples in addition to those already generally indicated above:

EXAMPLE 1

As shown in the detailed flow sheet which follows, this example has been broken down for convenience into nine (9) separate steps.

*Step 1.*—The recycle cyclohexylamine recovered from step 3 together with fresh cyclohexylamine to make up the required amount is charged to the reaction vessel. Sodium chlorosulfonate is added with agitation and after the initial exothermic reaction has subsided (within minutes of the addition) the mixture is heated to reflux for one-half hour.

*Step 2.*—The hot (135° C.) slurry of sodium chloride in cyclohexylamine solution of cyclohexylammonium cyclohexylsulfamate is filtered into a slurry of calcium hydroxide in water.

*Step 3.*—While adding water to maintain approximately constant volume, most of the cyclohexylamine is distilled as the water azeotrope. (B. P. 94–96° C.) The cyclohexamine can be recovered from this aqueous solution by salting out with such compounds as sodium chloride, sodium hydroxide, sodium sulfate, etc. It is usually necessary to top the recovered cyclohexylamine by distillation to remove the last traces of water as no water can be recycled to the first step.

*Step 4.*—Recycle filtrate and washes from steps 7 and 8 are added together with additional water and the balance of the cyclohexylamine removed by distillation as a dilute water solution. These tailings are discarded.

*Step 5.*—The excess calcium hydroxide is neutralized by adding sulfuric acid until the pH of the solution is between 6 and 8. An activated carbon discoloring agent such as Darco G–60 is added, the solution agitated for one-half hour at 95–100° C., then cooled to 0–5° and filtered.

*Step 6.*—The filtrate from step 5 is concentrated by distillation until the concentration of calcium cyclamate is 40% by weight.

*Step 7.*—The product is crystallized by coolng to 25° C. with agitation. The slurry is filtered and the filtrate divided into two parts—⅚ for recycle to step 4 and ⅙ to be discarded.

*Step 8.*—The crystals from step 7 are washed twice with water at 20–25° C. and the washes recycled to step 4.

*Step 9.*—The crystals are dried in a vacuum oven at 100±5° C. to give calcium cyclohexylsulfamate dihydrate. Yield from sodium chlorosulfonate 96%; yield from cyclohexylamine 55%.

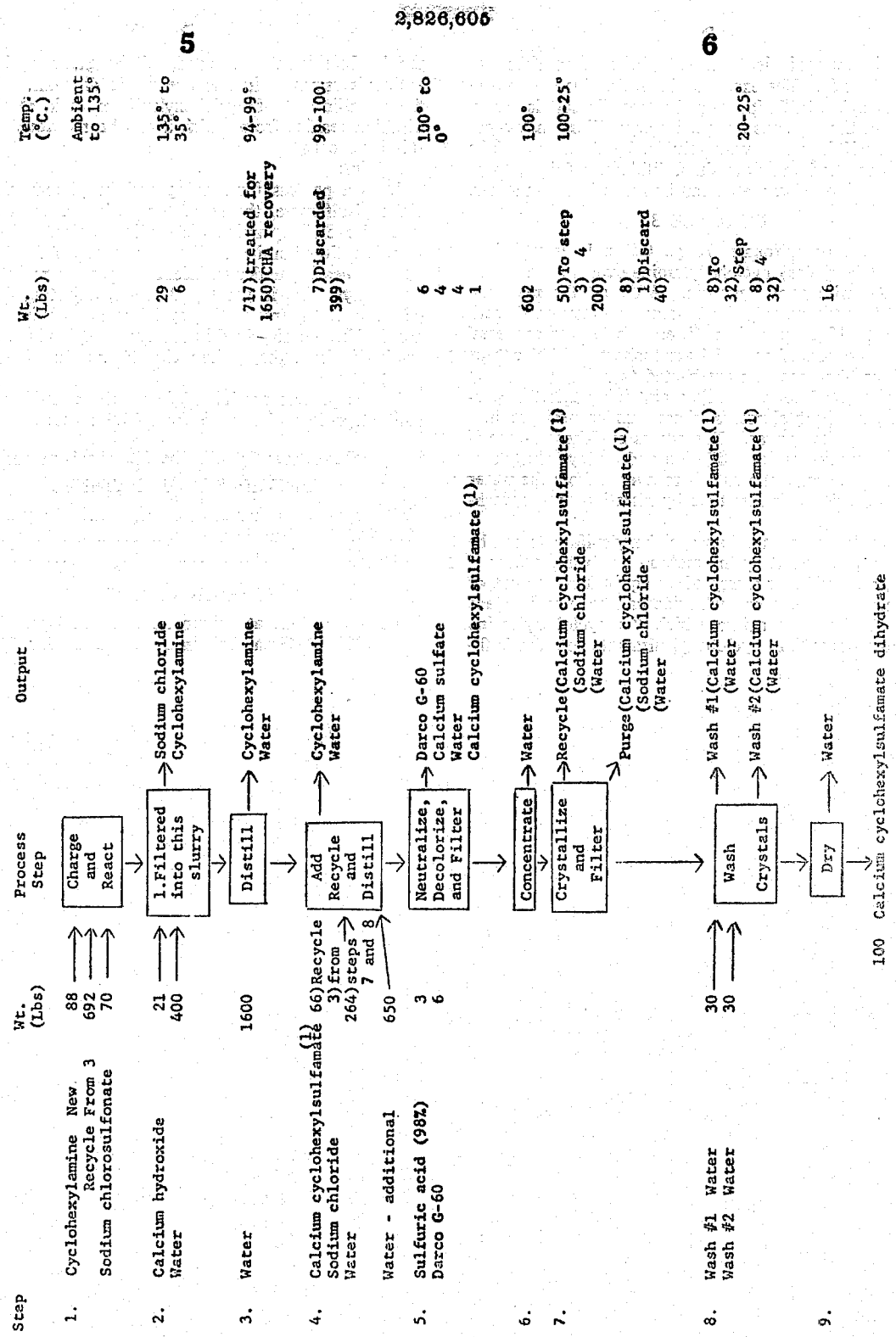

EXAMPLE 2

Sodium chlorosulfonate, 14 g., 0.1 mole is added to stirred cyclohexylamine, 350 ml., 3.0 moles. The temperature rises from 27° to 36° C. during the quarter-hour addition. The mixture is then heated to reflux (133° C.) for one-half hour and filtered hot.

On cooling the filtrate, cyclohexylammonium cyclohexylsulfamate crystallized. The slurry is filtered, the solids washed with ether and dried. There is received 24.5 g. (0.008 mole) cyclohexylammonium cyclohexylsulfamate, M. P. 187–190° (pure cyclohexylammonium cyclohexylsulfamate melts 192–194°). Anal. $SO_3NH_2$: Calc'd 34.50; found 31.25. When the filtrate from the original cyclohexylammonium cyclohexylsulfamate crystallization is analyzed, it is found to contain 2.5 g. cyclohexylammonium cyclohexylsulfamate (0.009 mole) which brings the yield from sodium chlorosulfonate to 97%.

Cyclohexylammonium cyclohexylsulfamate can be converted to any salt of cyclomate by heating an aqueous slurry with an equivalent amount of the appropriate metallic hydroxide. The excess cyclohexylamine is removed by azeotropic distillation and the metallic salt is recovered from the aqueous system by crystallization, evaporation, or if it is not very soluble, by filtration. Salts such as the sodium, potassium, lithium, calcium, magnesium, barium, silver, etc., can be made in this manner.

EXAMPLE 3

Sodium chlorosulfonate, 70 g., 0.5 mole is added to 300 g. (3.03 moles) cyclohexylamine over a twenty-minute period with good agitation. After all the reactants have been well mixed, the reactor is pressurized with nitrogen to 15–20 p. s. i. g. (i. e. 1 to 1.3 atmospheres' pressure in excess of normal 1 atmosphere). Under these conditions, the reactants are heated to reflux (160–165° C.) for one-half hour. While maintaining this temperature, the resulting slurry is filtered under pressure into 1000 ml. distilled water. The excess cyclohexylamine is removed by azeotropic distillation and the cyclohexylammonium cyclohexylsulfamate is recovered from the water residue in which it is insoluble by filtration, water washing and drying.

This cyclohexylammonium cyclohexylsulfamate can be converted to any salt by the method of Example 2 or if desired, a solution or slurry of an equivalent amount of the appropriate metallic hydroxide can be used in place of the distilled water into which the cyclohexylamine cyclohexylammonium cyclohexylsulfamate solution is filtered. In this latter method, all the excess cyclohexylamine is removed in one azeotropic distillation leaving the metallic salt of cyclohexylsulfamic acid in the distillation residue from which it can be recovered by any suitable means.

I claim:

1. In a process for making cyclohexylammonium cyclohexylsulfamate, the steps comprising reacting a mixture of cyclohexylamine and sodium chlorosulfonate in a mole ratio of amine to chlorosulfonate of from 5:1 to 40:1 by heating under sufficient pressure to maintain the cyclohexylamine in the liquid phase, adjusting the temperature to maintain the cyclohexylammonium cyclohexylsulfamate dissolved in the cyclohexylamine and separating it from the sodium chloride produced as a by-product.

2. The process of claim 1 in which the mole ratio of amine to chlorosulfonate is from 10:1 to 20:1.

References Cited in the file of this patent

UNITED STATES PATENTS

| 2,202,212 | Lecher et al. | May 28, 1940 |
| 2,275,125 | Audrieth et al. | Mar. 3, 1942 |
| 2,383,617 | Robinson | Aug. 28, 1945 |

FOREIGN PATENTS

| 662,800 | Great Britain | Dec. 12, 1951 |
| 669,200 | Great Britain | Mar. 26, 1952 |